(12) United States Patent
Moen et al.

(10) Patent No.: US 10,597,984 B2
(45) Date of Patent: Mar. 24, 2020

(54) INFLOW CONTROL DEVICE

(71) Applicant: Schlumberger Technology Corporation, Sugar Land, TX (US)

(72) Inventors: Terje Moen, Algard (NO); Aleksandar Rudic, Algard (NO); Ambrish Pandey, Algard (NO); Gocha Chochua, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 204 days.

(21) Appl. No.: 14/959,929

(22) Filed: Dec. 4, 2015

(65) Prior Publication Data

US 2016/0160616 A1   Jun. 9, 2016

Related U.S. Application Data

(60) Provisional application No. 62/088,355, filed on Dec. 5, 2014.

(51) Int. Cl.
*E21B 43/12* (2006.01)
*E21B 43/08* (2006.01)
*F16K 11/02* (2006.01)
*F16K 25/00* (2006.01)

(52) U.S. Cl.
CPC .............. *E21B 43/08* (2013.01); *E21B 43/12* (2013.01); *F16K 11/02* (2013.01); *F16K 25/005* (2013.01)

(58) Field of Classification Search
CPC .... E21B 34/08; E21B 43/12; Y10T 137/2115; Y10T 137/2087; Y10T 137/2098; Y10T 137/2104; Y10T 137/2065; Y10T 137/2109; Y10T 137/2506
See application file for complete search history.

(56) References Cited

U.S. PATENT DOCUMENTS

| | | | | |
|---|---|---|---|---|
| 3,267,946 A | * | 8/1966 | Adams | F15C 1/16 137/813 |
| 4,206,783 A | * | 6/1980 | Brombach | E03F 5/106 137/808 |
| 4,333,499 A | * | 6/1982 | Beck | F15D 1/0015 137/812 |
| 5,303,782 A | * | 4/1994 | Johannessen | E03F 5/106 137/809 |
| 8,534,355 B2 | | 9/2013 | Johannesen | |
| 8,875,797 B2 | | 11/2014 | Aakre et al. | |
| 9,279,309 B2 | | 3/2016 | Werswick et al. | |

(Continued)

OTHER PUBLICATIONS

Search Report and Written Opinion of International Application No. PCT/US2015/064018 dated Feb. 22, 2016, 17 pages.

*Primary Examiner* — Kipp C Wallace

(57) ABSTRACT

An apparatus includes an inflow control device that is disposed in a well and is adapted to receive a flow. The inflow control device includes a chamber, an outlet and at least one inlet. The chamber has a first end, a second end, and a cross-section of the chamber decreases along a length of the chamber. The outlet is disposed at the second end of chamber. The inlet has a cross-sectional dimension and is adapted to, in response to the received flow, inject a flow into the chamber near the first end of the chamber such that a fluid flow is produced inside the chamber that rotates and translates in a direction along the length of the chamber toward the outlet.

19 Claims, 14 Drawing Sheets

(56) References Cited

U.S. PATENT DOCUMENTS

| | | |
|---|---|---|
| 9,353,608 B2 | 5/2016 | Johannessen |
| 9,624,759 B2 | 4/2017 | Mathiesen et al. |
| 9,683,429 B2 | 6/2017 | Mathiesen et al. |
| 2008/0149323 A1 | 6/2008 | OMalley et al. |
| 2009/0133869 A1 | 5/2009 | Clem |
| 2011/0186300 A1* | 8/2011 | Dykstra ............ E21B 34/08 166/316 |
| 2012/0145385 A1 | 6/2012 | Lopez |
| 2012/0152527 A1* | 6/2012 | Dykstra ............ E21B 34/08 166/223 |
| 2013/0048299 A1 | 2/2013 | Fripp et al. |
| 2013/0299198 A1* | 11/2013 | Gano ............ E21B 34/06 166/386 |
| 2014/0231095 A1* | 8/2014 | Lopez ............ F16K 15/03 166/373 |
| 2014/0246206 A1 | 9/2014 | Least et al. |
| 2014/0290776 A1* | 10/2014 | Dykstra ............ E21B 43/12 137/810 |
| 2015/0021019 A1* | 1/2015 | Veit ............ E21B 34/08 166/250.15 |
| 2015/0040990 A1 | 2/2015 | Mathiesen et al. |
| 2016/0230509 A1* | 8/2016 | Lopez ............ E21B 43/08 |

\* cited by examiner

INFLOW CONTROL DEVICE

BACKGROUND

When well fluid is produced from a subterranean formation, the fluid typically contains particulates, or "sand." The production of sand from the well typically is controlled for such purposes as preventing erosion and protecting upstream equipment. One way to control sand production is to install sand screens in the well to filter sand from the produced well fluid. Various types of sand screens may be used, such as a sand screen that is formed from a cylindrical mesh or a sand screen that is formed by wrapping wire in a helical pattern.

The sand screen may be part of a larger sand screen assembly. In addition to one or multiple sand screens, the sand screen assembly may include a base pipe that forms part of a tubing string and one or more inflow control devices (ICDs), which regulate the flow of the produced well fluid into the interior space of the base pipe.

SUMMARY

The summary is provided to introduce a selection of concepts that are further described below in the detailed description. This summary is not intended to identify key or essential features of the claimed subject matter, nor is it intended to be used as an aid in limiting the scope of the claimed subject matter.

In an example implementation, an apparatus includes an inflow control device that is disposed in a well and is adapted to receive a flow. The inflow control device includes a chamber, an outlet and at least one inlet. The chamber has a first end, a second end, and a cross-section of the chamber decreases along a length of the chamber. The outlet is disposed at the second end of chamber. The inlet has a cross-sectional dimension and is adapted to, in response to the received flow, inject a flow into the chamber near the first end of the chamber such that a fluid flow is produced inside the chamber that rotates and translates in a direction along the length of the chamber toward the outlet. In another example implementation, a system includes a tubing string to be disposed in a well, at least one screen assembly and at least one inflow control device. The tubing string communicates a fluid flow between a region outside of the screen assembly and an interior space of the tubing string. The inflow control device includes a chamber, an outlet and at least one inlet. The chamber has a first end, a second end, and a cross-section of the chamber decreases along a length of the chamber. The outlet is disposed at the second end of chamber. The inlet has a cross-sectional dimension and is adapted to, in response to the received flow, inject a flow into the chamber to regulate a flow regime of the flow at the outlet based at least in part on a fluid property of the flow.

In another example implementation, a technique includes, downhole in a well, communicating fluid from a first region that surrounds a screen assembly through a screen and into an inflow control device. The inflow control device is used to regulate communication of the fluid into a base pipe of the screen assembly. The inflow control device regulates a flow regime at an outlet of the inflow control device based on at least one fluid property of the fluid.

Advantages and other features will become apparent from the following drawings, description and claims.

DETAILED DESCRIPTION

In the following description, numerous specific details are set forth but implementations may be practiced without these specific details. Well-known circuits, structures and techniques have not been shown in detail to avoid obscuring an understanding of this description. "An implementation," "example implementation," "various implementations" and the like indicate implementation(s) so described may include particular features, structures, or characteristics, but not every implementation necessarily includes the particular features, structures, or characteristics. Some implementations may have some, all, or none of the features described for other implementations. "First", "second", "third" and the like describe a common object and indicate different instances of like objects are being referred to. Such adjectives do not imply objects so described must be in a given sequence, either temporally, spatially, in ranking, or in any other manner. "Coupled" and "connected" and their derivatives are not synonyms. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same implementation.

Figure 1:
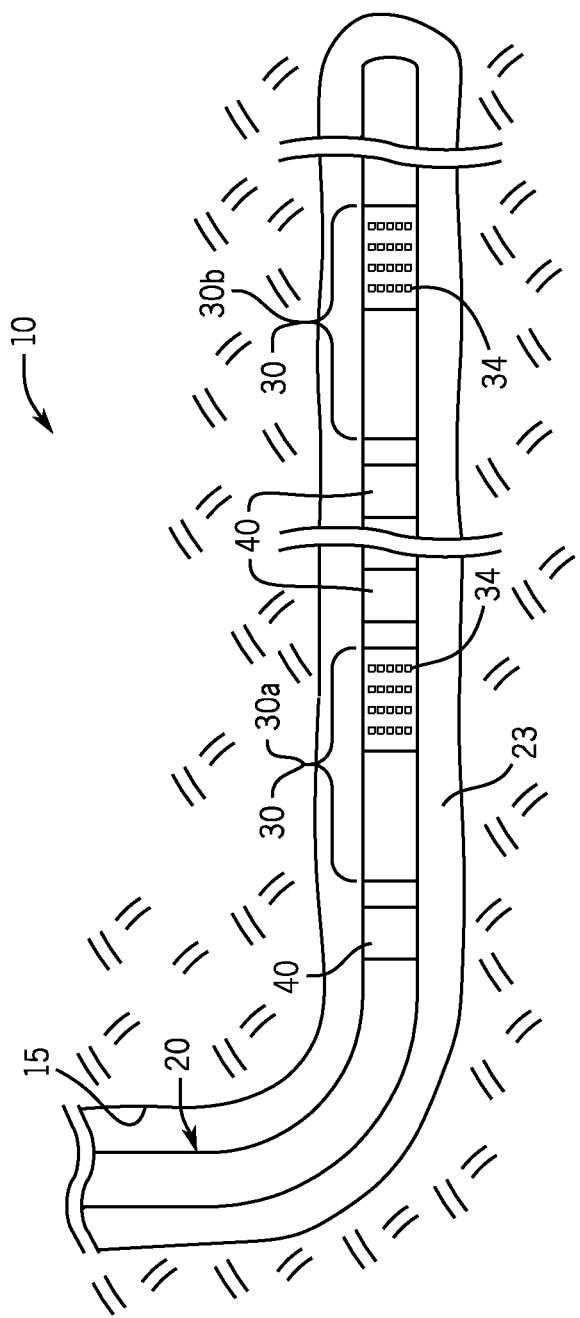
FIG. 1 is a schematic diagram of a well according to an example implementation.

Referring to FIG. 1, in accordance with implementations, a well system 10 may include a deviated or lateral wellbore 15 that extends through one or more formations. Although the wellbore 15 is depicted in FIG. 1 as being uncased, the wellbore 15 may be cased, in accordance with other implementations. Moreover, the wellbore 15 may be part of a subterranean or subsea well, depending on the particular implementation.

As depicted in FIG. 1, a tubular completion string 20 extends into the wellbore 15 to form one or more isolated zones for purposes of producing well fluid or injecting fluids, depending on the particular implementation. In general, the string 20 includes completion screen assemblies 30 (example screen assemblies 30a and 30b being depicted in FIG. 1), which either regulate the injection of fluid from the central passageway of the string 20 into the annulus or regulate the production of produced well fluid from the annulus into the central passageway of the string 20. In addition to the screen assemblies 30, the string 20 may include packers 40 (shown in FIG. 1 their unset, or radially contracted states), which are radially expanded, or set, for purposes of sealing off the annulus to define the isolated zones.

For the following discussion, it is assumed that the string 20 receives produced well fluid, although the concepts, systems and techniques that are disclosed herein may likewise be used for purposes of injection, in accordance with further implementations.

Figure 2:
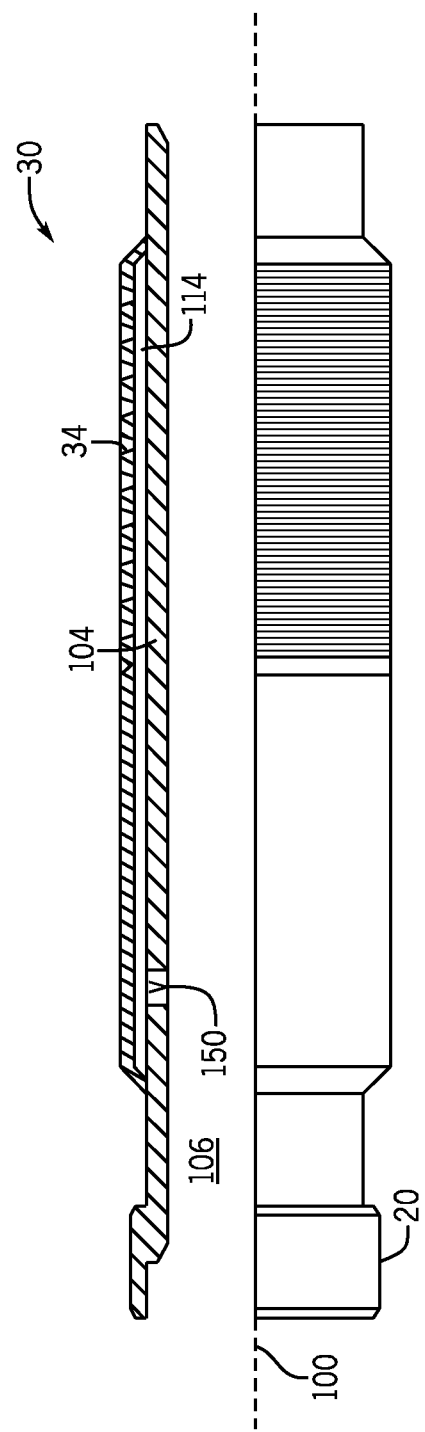
FIG. 2 is a schematic diagram of a screen assembly according to an example implementation.

Each screen assembly 30 includes a sand screen 34, which is constructed to allow produced well fluid to flow into the central passageway of the string 20 for purposes of allowing the produced fluid to be communicated to the Earth surface of the well. Referring to FIG. 2 in conjunction with FIG. 1, in accordance with some implementations, each completion screen assembly 30 includes a base pipe 104 that is concentric about a longitudinal axis 100 and forms a portion of the tubular string 20; and the assembly's sand screen 34 circumscribes the base pipe 104 to form an annular fluid receiving region 114 between the outer surface of the base pipe 104 and the interior surface of the sand screen 34.

It is noted that FIG. 2 is merely an example of a screen assembly in accordance with one of many possible implementations. As another example, in accordance with further example implementations, the region outside the screen assembly 30 may be gravel-packed, and the completion screen assembly 30 may include a sleeve valve that may be selectively opened and/or closed for purposes of conducting a gravel packing operation. Thus, many variations of screen assemblies are contemplated and fall within the scope of the appended claims.

Each screen assembly 30 includes one or more inflow control devices (ICDs) 150 (one exemplary ICD valve 150 being depicted in FIG. 2), which regulate fluid communication between a central passageway 106 of the base pipe 104 and the annulus of the well. As depicted in FIG. 2, the ICD 150 may be disposed in a wall of the base pipe 104. In further example implementations, the ICD 150 may be disposed in a ring that is connected to the base pipe, as described below in connection with FIGS. 13A and 13B.

Inflow control devices (ICDs), such as ICD 150, may be used in downhole production sections, such as screen assembly 30, for purposes of regulating production so that the producing reservoir is generally uniformly depleted. In this manner, during oil production, the pressure distribution inside the completion tubing may not be uniform due to internal frictional losses in the tubing and varying flow rates at different sections of the tubing. Additionally, formation permeabilities, which affect the production rate, may significantly vary from zone to zone.

For example, a lateral or horizontal well, such as the lateral wellbore 15 of FIG. 1, may have a heel and a toe that are subject to different differential pressures and depletion rates. For example, the heel section of the completion may have an associated higher differential pressure and an associated faster depletion rate relative to the toe section, thereby giving rise to a "heel-to-toe" effect. For purposes of producing oil, a change in the oil/water interface and/or an oil/gas interface, called "coning," may lead to premature breakthrough of the "unwanted" fluids, such as gas or water.

Gas and water play important roles when left in place. In this manner, gas, due to its relatively higher compressibility, and hence, its relatively higher stored energy, serves as a driver to displace oil in the formation. Water serves the role of lifting the oil and may be produced with the oil (up to a ninety percent water cut, for example). ICDs, such as ICD 150, control water and gas production, as breakthrough of the gas means (due to its higher mobility) that the gas is primarily produced, which results in loss of the energy of the gas cap, which, in turn, reduces the "push" of the oil. The ICDs, such as ICD 150, may be used to regulate the production of water or gas, in accordance with example implementations, the ICDs may inhibit gas or water production to a variable degree depending on dimensional parameters of the various implementations.

If appropriate measures are not in place downhole, water and gases may begin to dominate the volume fraction of the produced mixture because water, with its relatively lower viscosity, and gases, due to both their lower viscosities and densities, flow through the formation with lower resistances than oil. This may place an additional burden on the aboveground separators and recycling systems and may lead to premature abandonment of partially depleted reservoirs, leaving the majority of the oil near the completion unproduced, which, in turn, strongly affects well profitability.

In accordance with systems and techniques that are disclosed herein, the ICD 150 is selective to one or more fluid properties (viscosity, density and flow rate, as examples) such that ICD 150 introduces a relatively larger flow resistance and a relatively larger pressure drop for an "undesirable" fluid (gas or water, for oil production, example) and a relatively lower flow resistance and relatively lower pressure drop for a "desirable" fluid (light oil or heavy oil, as examples). In this manner, the potential well fluids that may be produced vary in composition and have different associated Reynolds numbers.

The Reynolds number is function of fluid properties, such as viscosity, density and flow rate. The desired fluid has one set of fluid properties, such as given viscosity and given density or a range of viscosities and densities, as compared to the non-desired fluid having different set of the same properties (viscosity and density). For a given flow rate, these fluid property differences may result in different corresponding Reynolds numbers; and consequently, differences in the corresponding flow behaviors inside the ICD 150.

It is noted that the particular fluid that is considered "desirable" or "undesirable" depends on the particular application. As an example, the ICD 150 may be constructed for a use case in which light oil is being produced and there is a gas breakthrough problem. For this use case, the light oil is the desirable fluid, and gas is the undesirable fluid. As another example, the ICD 150 may be constructed for a use case in which heavy oil is to be produced in the presence of a high water cut. For this use case, the heavy oil is the desirable fluid, and water is the undesirable fluid. As another example, the ICD 150 may be constructed for a use case in which light oil is to be produced in the presence of a high water cut. For this use case, the light oil is the desirable fluid, and water is the undesirable fluid.

For the example use cases above, the desirable fluid has a relatively higher viscosity. However, in accordance with further example implementations, the desired fluid may have a lower viscosity. For example, in accordance with example implementations, to prevent water breakthrough in a gas well, gas (having a relatively lower viscosity) may be the desirable fluid and water (have a relatively higher viscosity) may be the undesirable fluid.

The ICD 150 may be constructed for other use cases, in accordance with further example implementations. In general, in accordance with example implementations that are disclosed herein, the ICD 150 has a more favorable pressure versus flow rate characteristic for a desirable fluid to be produced, as compared to the pressure versus flow rate characteristic of the ICD 150 for a less desirable fluid. In accordance with example implementations, the ICD 150 forms a vortex inducer, which creates jets from the incoming fluid flow and directs these jets into a flow chamber of the ICD 150. Inside the chamber of the ICD 150, the jets create a rotational flow as well as an axial flow that translates toward the chamber's outlet, which serves as the discharge for the ICD 150. As described herein, the induced rotational flow results in a pressure drop, and the extent of the pressure drop is a function of the fluid composition (fluid properties) of the flow.

Figure 3:
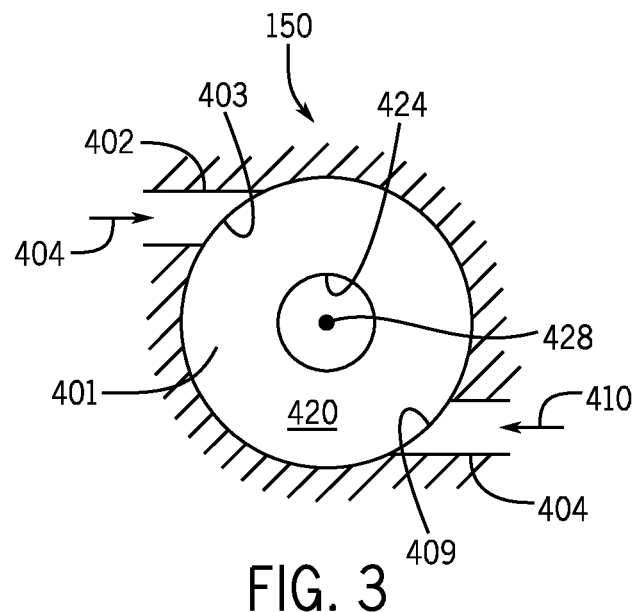
FIG. 3 is an axial cross-sectional view of an inflow control device of the assembly of FIG. 2 according to an example implementation.

Referring to FIGS. 3 (depicting an axial cross-section of the ICD 150) and 4A (depicting a longitudinal cross-section of the ICD 150), in accordance with example implementations, the ICD 150 has a generally frustoconical-shaped chamber 401 that is formed inside a housing of the ICD 150 and extends along a longitudinal axis 428 of the ICD 150. The ICD inflow control device 150 may have one or multiple inlets, depending on the particular implementation. For the specific example implementation of FIG. 3, the inflow control device 150 includes two inlets 403 and 409 that direct generally tangential jets 404 and 410, respectively into the chamber 401.

Figure 4A:
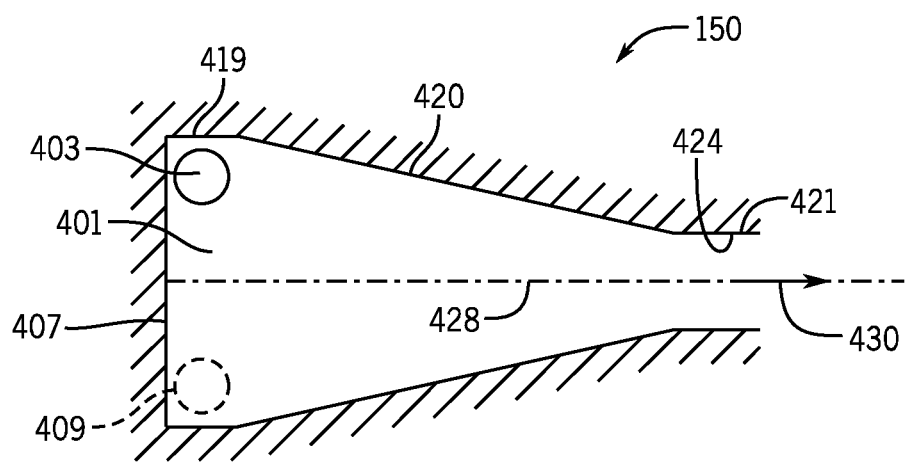
FIGS. 4A and 4B are longitudinal cross-sectional views of the inflow control device according to example implementations.

Referring to FIG. 4A, in general, the chamber 401 refers to the interior space that is defined by a chamber wall that surrounds the longitudinal axis 428 of the ICD 150; the chamber wall (and chamber 401) extends between the two ends of the chamber (here, a base wall 407 and an outlet 424 of the ICD 150); and the inlets 403 and 409 extend through the chamber wall.

It is noted that although FIG. 3 depicts the chamber 401 as being symmetric about the longitudinal axis 428, the chamber 401 may be eccentric with respect to the axis 428, in accordance with further example implementations. For example, instead of the cross-section of the chamber 401 (as seen in FIG. 3) being circular, the cross-section may be oval, elliptical or another shape.

In accordance with example implementations, the chamber 401 extends along the longitudinal axis 428 of the ICD 150 from a transverse base wall 407 (which is orthogonal to the axis 428) of the ICD 150 at one end of the chamber 401 to a discharge, or outlet 424, at the opposite end of the chamber 401. As depicted in FIG. 4A, the inlets 403 and 409 inject their jets near the end of the chamber 401 associated with the base wall 407. In accordance with example implementations, the outlet 424 is generally coaxial with the longitudinal axis 428, and the chamber 401 is generally symmetric about the axis 428.

As depicted in FIG. 3, in accordance with example implementations, the inlets 403 and 409 may be oriented to produce jets 404 and 410 that are generally tangential (i.e. the jets 404 and 410 are directed in associated directions that generally correspond to tangents of a circle associated with the perimeter of the base wall 407, or in general, correspond to tangents of a circle for which the inlets 403 and 409 may be considered points that are on or near the circle).

Figure 17:
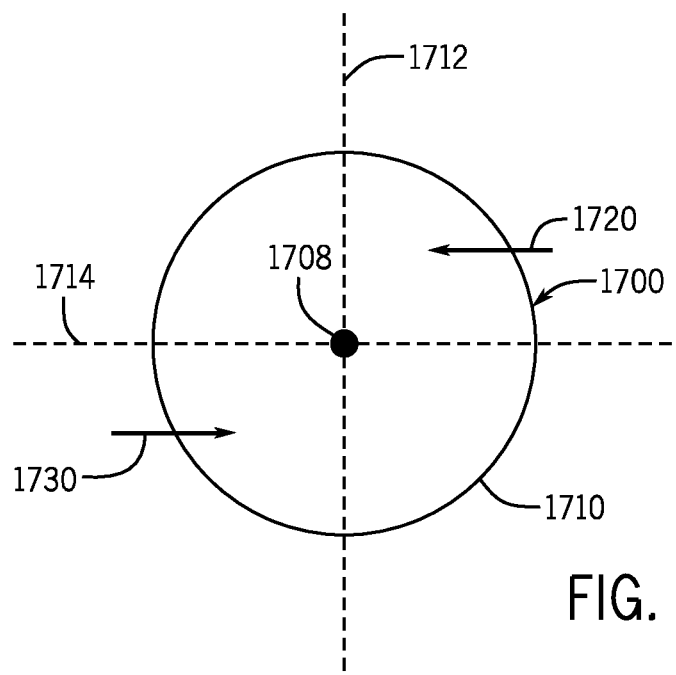
FIG. 17 is a cross-sectional view of an inflow control device according to a further example implementation.

The jets 404 and 410 are opposed to each other. In this context, the jets 404 and 410 being "opposed" refers to the jets 404 and 410 having orientations such that 1. the jets 404 and 410 are directed to opposite sides of a plane that extends between the jets 404 and 410; and 2. the plane contains the longitudinal axis 428 of the ICD 150. In this manner, FIG. 17 is a cross-sectional view of a chamber 1710 of an ICD 1700 according to an example implementation. The ICD 1700 has two inlets that introduce corresponding jets 1720 and 1730. As depicted in FIG. 17, a plane 1712 may be hypothetically constructed that extends between the jets 1720 and 1730 and contains a longitudinal axis 1708 of the ICD 1700. The jets 1720 and 1730 are opposed, in that the jets 1720 and 1730 are directed to opposite sides of the plane 1712.

A given pair of jets may also be "directly opposed," which refers to the jets being "opposed" and the directions of the jets (at least at their points of injection) being generally coaxial with a plane that contains the longitudinal axis. For the example of FIG. 17, if the inlets for the jets 1720 and 1730 were repositioned so that the jets 1720 and 1730 are directed toward each other from opposite sides of the chamber 1710 and the jet directions at the jet injection points are generally within a plane containing the longitudinal axis 1708 (such as the plane 1714), then the jets 1720 and 1730 would be considered to be "directly opposed."

Referring back to FIG. 3, the inlets 403 and 409 are offset from each other by an angle about the longitudinal axis 428; and the inlets 403 and 409 are opposed to each other. In this context, the inlets 403 and 409 being "opposed" refers to the inlets 403 and 409 being at least partially located in opposing quadrants of the angular space about the longitudinal axis 428. In this manner, referring to FIG. 17, orthogonal planes, such as example orthogonal planes 1712 and 1714, may be hypothetically constructed, which contain the longitudinal axis 1708 and divide the angular space about the longitudinal axis 1708 into four, ninety degree quadrants. The inlets that provide the jets 1720 and 1730 are opposed, in that the inlets have an associated offset that disposes the inlets in opposing (i.e., nonadjacent) quadrants of the angular space about the longitudinal axis 1708.

A given pair of inlets may also be "directly opposed." In this context, a pair of inlets being "directly opposed" refers to the inlets being "opposed" and at least a portion of each inlet of the pair being coplanar with the longitudinal axis of the ICD. For example, if the inlets providing the jets 1720 and 1730 were repositioned so that the inlets were located on opposite sides of the chamber 1710 and were each partially contained in a plane containing the longitudinal axis 1708 (such as the plane 1714), then the inlets would be considered to be "directly opposed."

Referring back to FIG. 3, in accordance with example implementations, the inlets 403 and 409 may be oriented to produce jets 404 and 410 that have directions that are neither tangential nor directly opposed, but rather somewhere in between (orientations in which the jets 404 and 410 are closer to being tangential than to being directly opposed, for example).

Regardless of their specific orientations, the inlets 403 and 409 introduce the jets 404 and 410 into the chamber 401 in such a manner that the interaction of the jets 404 and 410 with the wall of the chamber 401 produces a flow that rotates and translates in a direction toward the outlet 424 of the ICD 150.

The cross-section of the chamber 401 progressively narrows in a direction from the base wall 407 toward the outlet 424. In this manner, as depicted in FIG. 4A, in accordance with example implementations, the chamber 401 may have a larger diameter, circularly cylindrical section 419 that surrounds the inlets 403 and 409; a frustoconical section 420 that has a tapering diameter and extends from the section 419; and another smaller diameter circularly cylindrical section 421 at the outlet 424. The particular shapes of the cylindrical and/or frustoconical sections of the chamber 401 may vary in length and diameter from that shown in FIG. 4A and may assume other forms, as further described herein. Moreover, the frustoconical angle of section 420 may vary from that depicted in FIG. 4A, in accordance with example implementations. The radial distance between the inlets 403 and 409 may also vary from that shown in FIG. 4, in accordance with further example implementations. Additionally, although FIGS. 3 and 4A depict two inlets 403 and 409, the ICD 150 may have a single inlet or more than two inlets, in accordance with further example implementations.

For the example implementation that is depicted in FIGS. 3 and 4A, the wall of the chamber 401 is smooth, which may be beneficial, for example, for purposes of minimizing flow turbulence. In accordance with further implementations, however, the ICD may have additional features on its chamber wall for purposes of enhancing some aspect of the rotational flow and/or increasing pressure loss that is associated with the rotational flow. For example, in accordance with further example implementations, one or more structures may extend from or be recessed in the wall of the chamber.

For example, in accordance with further example implementations, a chamber wall 470 (FIG. 4D) may have "rifling," or a spirally-extending groove 472 on the interior surface of the wall 470. It is noted that the spirally-extending groove 472 may have a winding direction that coincides with or does not coincide with the direction of fluid rotation inside the chamber 401, depending on the particular implementation.

In further implementations, the ICD may have a structure or multiple structures (raised, channel-defining structures, for example) that extend inwardly from the interior wall that forms the chamber 401. As another example, the surface of the chamber 401 may have a texture, such as example texture 462 of an example chamber wall 460 that is depicted in FIG. 4C, or a certain roughness for purposes of enhancing some aspect of the rotational flow and/or increasing a pressure loss that is associated with the rotational flow. The particular geometry of the chamber; the chamber surface; the presence/absence of obstructions, dimples, grooves, and so forth; may be varied, depending on the particular example implementation, to improve flow performance (reduce the pressure drop versus flow rate, for example) for the desired fluid and/or inhibit flow performance for the undesired fluid. Thus, many variations are contemplated, which are within the scope of the appended claims.

It is noted that the pressure loss inside the chamber of the ICD 150 is associated with rotational flow and may be also associated with frictional losses and fluid flow due to the wall roughness. In general, a rougher chamber wall surface corresponds to a greater friction, which opposes fluid flow, thereby dissipating energy and dropping more pressure. It is noted that the above-described "rifling," is an example of a shape out of many possible shapes to induce a spiral or rotational flow inside the chamber 401, thus creating a longer flow path for the unwanted fluid.

Figure 4B:
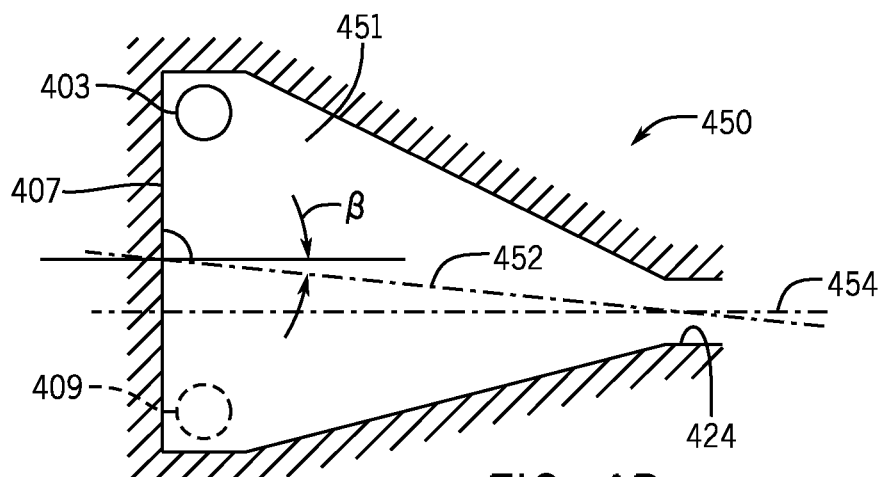
Figure 4C:
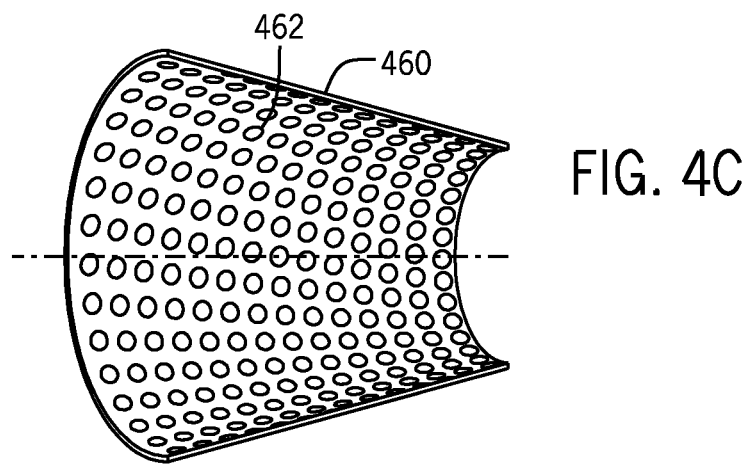
FIG. 4C is an illustration of a chamber surface texture of an inflow control device according to an example implementation.
Figure 4D:
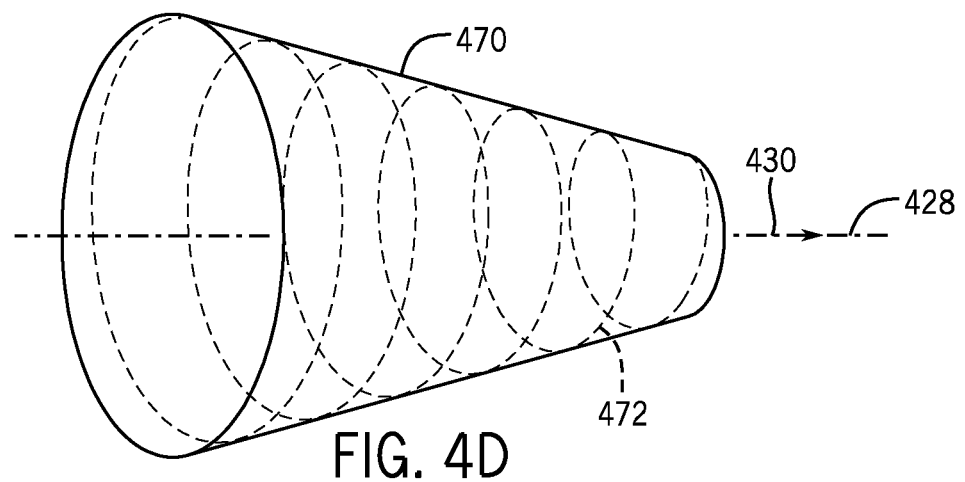
FIG. 4D is an illustration of a spirally extending groove formed in a chamber wall of an inflow control device according to an example implementation.

In accordance with example implementations, the ICD 150 may be replaced by an ICD 450 that is depicted in FIG. 4B. The ICD 450 has a similar design to the ICD 150, with similar reference numerals being used to denote similar features. Unlike the ICD 150, the ICD 450 has a longitudinal axis 452 that forms an angle (called "β" in FIG. 4B) with an axis 454 that extends perpendicularly from the chamber's base 407, thereby making the ICD 450 and its associated chamber 451 asymmetric.

Figure 5:
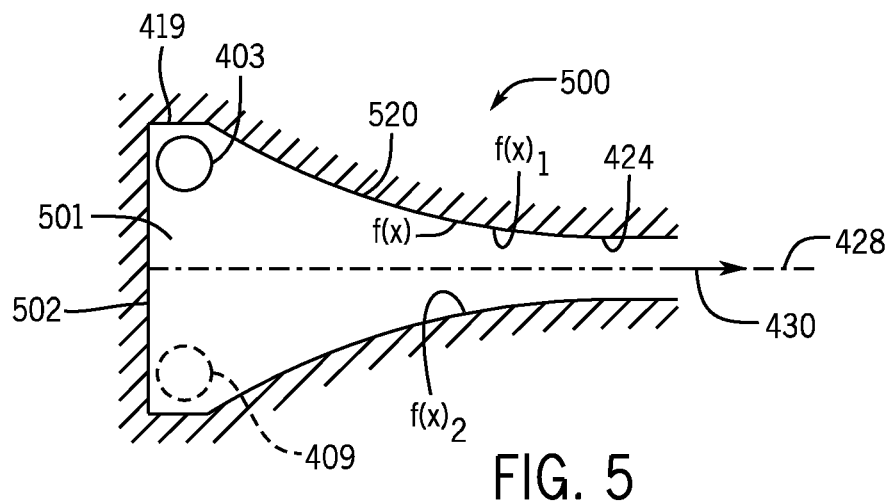
FIGS. 5, 6, 7A, 7B, 8A and 8B are longitudinal cross-sectional views of inflow control devices according to further example implementations.

The ICD chamber may have other shapes, in accordance with further example implementations. In this manner, FIG. 5 depicts an ICD 500 in accordance with further example implementations. The ICD 500 has a similar design to the ICD 150, with similar reference numerals being used to denote similar features. However, unlike the ICD 150, the ICD 500 has a chamber 501, which does not have the frustoconical 420 and cylindrical 421 sections of the ICD 150. Instead, for the ICD 500, a section 520 replaces the sections 420 and 421 of the ICD 150. As depicted in FIG. 5, the section 520 generally has a cross-sectional narrowing profile along the longitudinal axis 428 and may be described by an arbitrary function "f(x)," where "x" represents an axial position and "f(x)" may be dependent on various parameters and performance factors, depending on the particular implementation.

As illustrated in FIG. 5, in accordance with example implementations, the ICD 500 may be asymmetrical. In this regard, an arbitrary function called "f(x)1, " where "x" represents a position along the axis 428, may describe one part of the chamber wall, whereas one or more additional functions, such as illustrated function called "f(x)2," may describe another part of the chamber wall for the same axial position. In other words, the chamber wall may be asymmetric about the axis 428. Thus, the chamber 501 of the ICD 500 may have any of a number of different asymmetric or symmetric shapes, depending on the particular implementation.

Figure 6:
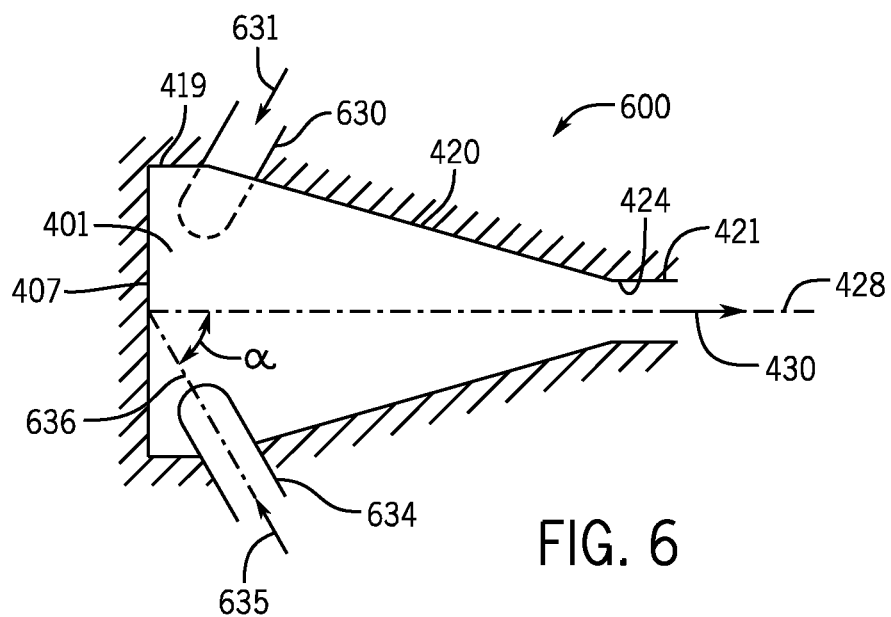

In further example implementations, an ICD 600 of FIG. 6 may be used. For this example implementation, the inflow control device 600 has a design similar to the ICD 150, with similar reference numerals being used to denote similar features. However, unlike the ICD 150, the ICD 600 includes angled inlets 630 and 634 that replace the inlets 403 and 409, respectively. The angled inlets 630 and 634 introduce jets 631 and 635, respectively, into the chamber 401. Each jet 631, 635 has both tangential and axial components. For the example implementation of FIG. 6, instead of being orthogonal to the longitudinal axis 428 (as depicted in FIG. 4A, for example), the jets 631 and 635 are disposed at acute angles relative to the longitudinal axis 428, as depicted in FIG. 6, for an axis 636 of the inlet 634 being disposed at an angle a relative to the longitudinal axis 428.

Figure 7A:
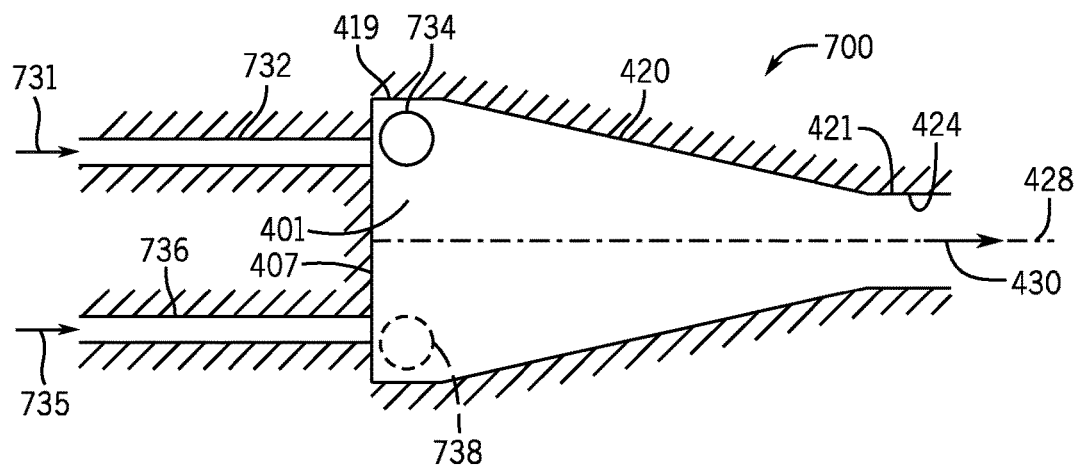

As another variation, FIG. 7A depicts an ICD 700 that has a similar design to the ICD device 150, with similar reference numerals being used to denote similar components. Unlike the ICD 150, however, the ICD 700 includes inlets 732 and 736 (replacing inlets 403 and 409, respectively) that are axially directed into the chamber 401 of the inflow control device 700. In this regard, the inlet 732 directs an axial jet 731 into the chamber 701; and likewise, the inlet 736 directs an axial jet 735 into the chamber 401. As shown in FIG. 7A, openings 734 and 738 of the axial inlets 732 and 736 introduce the axial jets 731 and 735 into the chamber 701. The axial jets 731 and 735 are offset relative to the longitudinal axis 428, which allows the jets 731 and 735 to induce rotation to the injected flow inside the chamber 401.

Figure 7B:
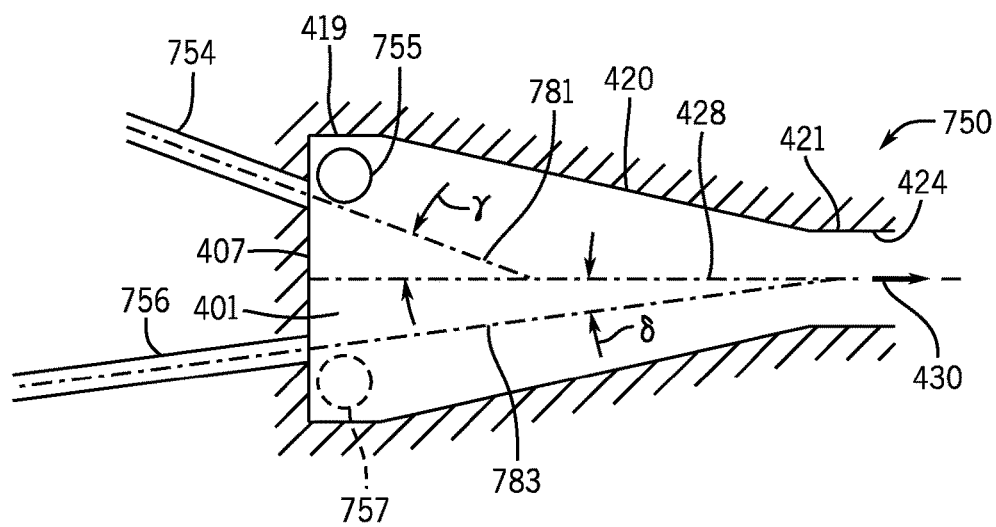

It is noted that the inlets of the ICD may form equal and/or different angles with the axis 428. In this manner, FIG. 7B depicts an ICD 750 that has a similar design to the ICD 700, except that inlets 755 and 757 are arranged at angles "γ" and "δ" with a longitudinal axis 428 of the ICD 750.

Figure 8A:
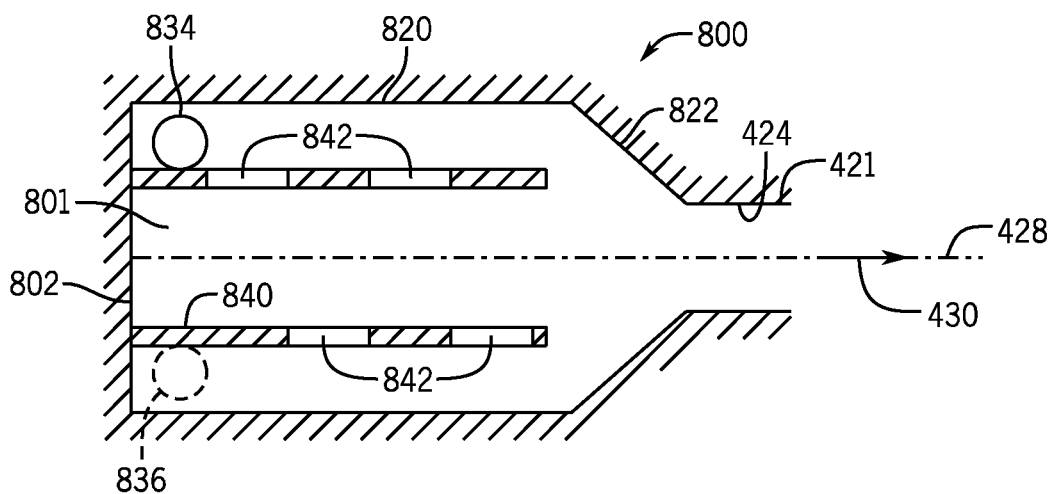

Referring to FIG. 8A, in accordance with further example implementations, an ICD 800 may be used. The ICD 800 has a chamber 801 that includes a relatively larger diameter cylindrical section 820 that circumscribes inlets 834 and 836 and is coaxial with the longitudinal axis 428; a relatively smaller diameter cylindrical section 421 that forms the outlet 424 of the ICD 801; and an intervening frustoconical section 822 between the sections 820 and 421.

The ICD 800 includes an inner tubular member, or tubing 840, which, as depicted in FIG. 8A, is disposed in the chamber 801 such that the longitudinal axis of the tubing 840 is coaxial with the longitudinal axis 428 of the ICD 800. Moreover, as depicted in FIG. 8, the tubing 840 contains radial ports 842. As fluid enters the ICD 800, a spiral flow is induced. Depending on fluid properties and rate, more or less fluid enters the radial ports 842 and continues a different flow path towards the outlet 424. As the dominating flow path changes depending on fluid properties, the ICD 800 may be constructed to promote more favorable behavior for a desired fluid (oil, for example) versus a non-desired fluid (water, for example).

Figure 8B:
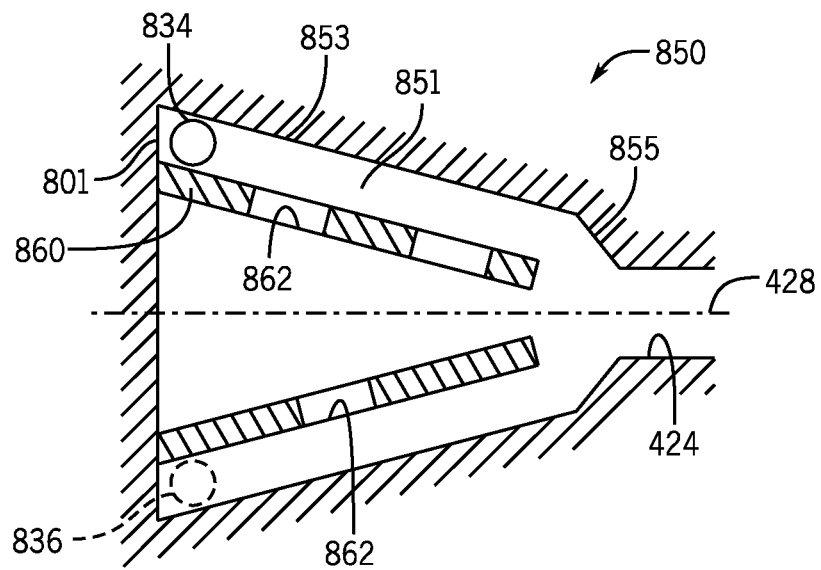

Referring to FIG. 8B, in accordance with further example implementations, an ICD 850 may be used. Similar to the ICD 800, the ICD 850 includes an inner tubular member, or tubing 860, inside a chamber 851. However, for the ICD 850, the chamber 851 does not include a circularly cylindrical section that surrounds inlets 834 and 836, but rather, the chamber 851 includes a narrowing frustoconical section 853 that extends from a transverse base wall 801 of the ICD 850 to a more sharply narrowing frustoconical section 855. The frustoconical section 855 extends to the outlet 424. As also depicted in FIG. 8B, the tubing 860 also has a frustoconical shape and includes ports 862 in the wall of the tubing 860.

The ICDs that are disclosed herein change a pressure of a received fluid flow between the inlet(s) and outlet of the ICD. This change in pressure is due at least in part to the rotational movement of the fluid flow, which is induced by the ICD. Fluid may, in accordance with example implementations, have a relatively high degree of rotation, even after the fluid exits the ICD. The pressure loss through the ICD may be associated with one or more of the following: nozzle pressure loss as the fluid enters the ICD; pressure loss associated with a rotational flow inside the ICD; and a pressure loss as the fluid exits the ICD. More particularly, the rotational flow may be associated a variable degree of pressure loss, which is related to the Reynolds number.

In general, a fluid flowing at a relatively low Reynolds number may more easily change its flow direction. Therefore, a fluid flow having a relatively low Reynolds number may be more easily translated from the rotational flow inside the ICD's chamber into an axial flow exiting the ICD, as compared to a flow that has a relatively higher Reynolds number. As a result, the distance traveled by the fluid flow and the resulting pressure loss through the ICD changes with the fluid properties.

Thus, the ICD, in general, generates simultaneous flow rotation and translation in its narrowing chamber to create more favorable flow characteristics for one type of fluid flowing through the ICD than another. The flow resistance ratio for a given pair of fluids flowing through the ICD may, in accordance with example implementations, change with flow rate. As a result, the flow resistances that are established by the ICD may change, depending on where the ICD is disposed in the well. For example, a first given ICD of a screen assembly (having one or more screens), which is disposed in a first region of the well may be subject to different flow rates (greater combined flow rates, for example) for a given pair of fluids than the flow rates (smaller combined flow rates, for example) for the same pair of fluids in a second given ICD of the screen assembly, which is disposed in a second region of the well. In this manner, the first given ICD, may, in accordance with example implementations, establish a different flow resistance ratio (a larger ratio, for example) for the pair of fluids than the flow resistance ratio that is established by the second given ICD.

In accordance with example implementations, the ICD forms a vortex inducer that creates a flow field at its outlet, which has both axial and swirling components. The swirling components form a "swirling jet," which may be associated with potentially four different flow regimes at the outlet of the ICD: 1.) a non-swirling jet; 2.) a weakly swirling jet; 3.) a strongly swirling jet; or 4.) vortex breakdown. The change between the regimes is a function of a parameter called the "swirl number" (S). As set forth below in Eq. 1, the S swirl number is defined as the ratio of maximum tangential velocity (Vt,max) to mean axial velocity of the jet (Uax) at the discharge:

$$S = \frac{V_{t,max}}{U_{ax}}. \qquad \text{Eq. 1.}$$

Vortex breakdown occurs when the S swirl number exceeds a certain critical value.

In accordance with the implementations described herein, a swirling jet is created by the interaction of the inlet jets with the stationary wall of the chamber. In accordance with example implementations, the inlet jet nozzles are sized and positioned such way that the jets produce different S swirl numbers at the outlet of the ICD for a given pair of fluids (light oil and water, as an example pair). In accordance with example embodiments, the undesired fluid of the pair exits the outlet of the ICD in the vortex breakdown mode, i.e. with higher hydrodynamic resistance due to the stagnation point near or even inside the throat of the outlet.

Figure 10:
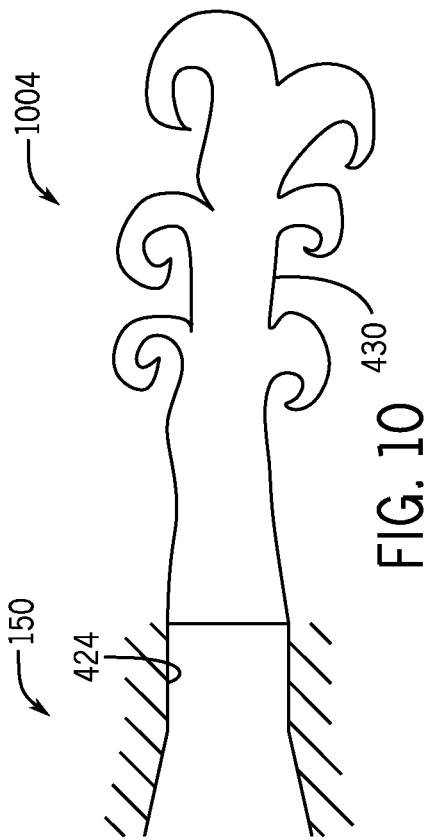
FIGS. 10 and 11 illustrate flow regimes at the outlet of an inflow control device according to example implementations.
Figure 11:
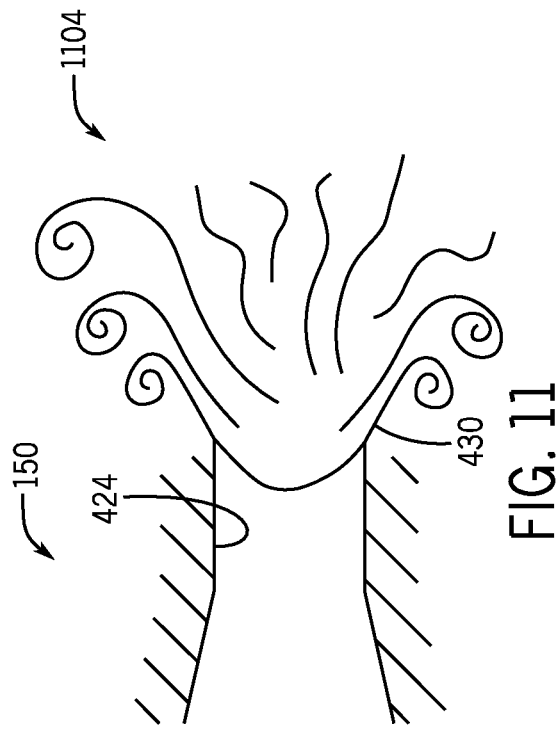

FIG. 11 illustrates the ICD 150 having a vortex breakdown flow regime mode 1104 at the outlet 424. The desired fluid of the pair (i.e., the fluid having the relatively low Reynolds number and the relatively higher viscosity) exits the outlet of the ICD in a swirling jet mode. In this manner, FIG. 10 depicts a weakly swirled flow regime mode 1004 at the outlet 424 of the ICD 150. This self-induced fluid instability in rotating flow nozzles helps to reverse the natural tendency that is exhibited by traditional nozzles, which favor low viscosity fluids. As noted above, depending on the particular implementations, the desirable fluid may have the lower or higher viscosity depending on the particular implementations.

Figure 9:
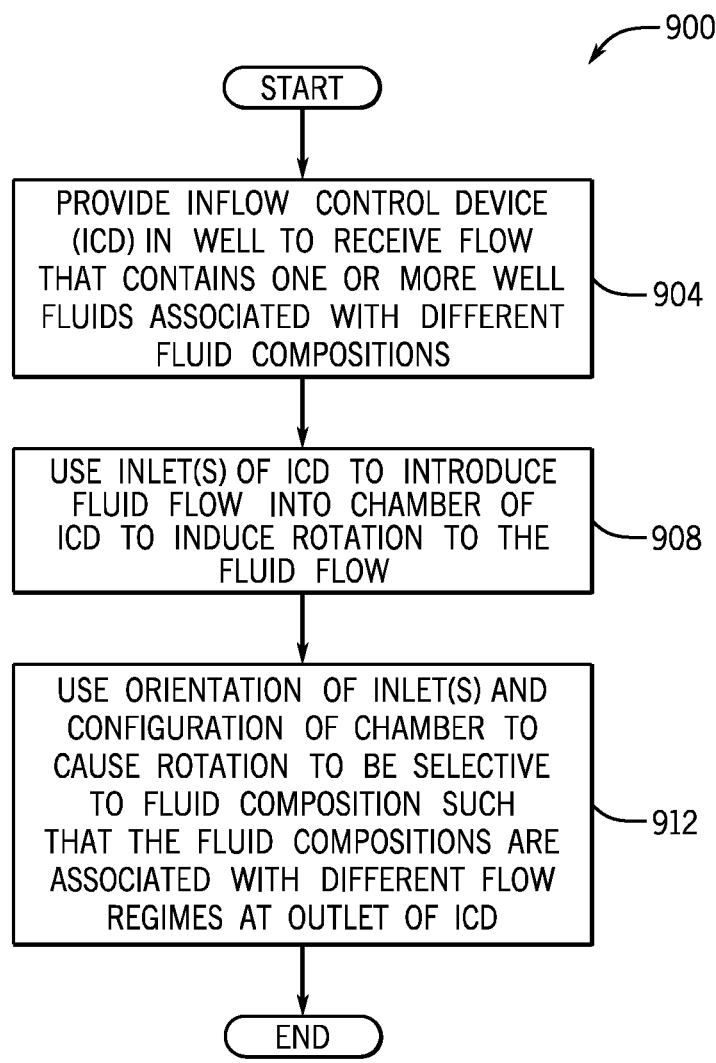
FIG. 9 is a flow diagram depicting a technique to use an inflow control device to create fluid property selective flow regimes at an outlet of the device according to an example implementation.

Thus, referring to FIG. 9, in accordance with example implementations, a technique 900 includes providing (block 904) an inflow control device (ICD) in a well to receive a fluid flow that contains one or more well fluids that are associated with different fluid compositions. The technique 900 includes using (block 908) one or more inlets of the ICD to introduce the fluid flow into a chamber of the ICD to induce rotation to the fluid flow. The technique 900 also includes using (block 912) the orientation of the inlet(s) and the configuration of the chamber to cause the rotation to be selective to the fluid composition such that the fluid compositions are associated with different flow regimes at the outlet of the ICD.

Figure 12:
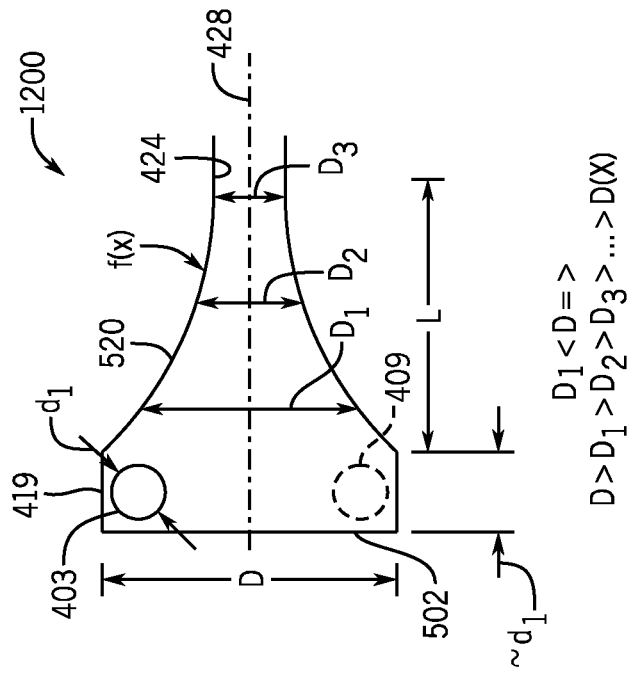
FIG. 12 illustrates a geometry of an inflow control device according to an example implementation.

Referring to FIG. 12, in accordance with example implementations, the ICD has geometrical relationships that are depicted by illustration 1200. It is noted that although the ICD 500 of FIG. 5 is used to illustrate these relationships, the same general geometrical constraints may apply to the other ICDs, in accordance with further example implementations.

In the following discussion, the inlet (such as inlet 403) has an associated cross-sectional dimension. As an example, the cross-sectional dimension may be a dimension that is measured in an orthogonal direction from the longitudinal axis of the inlet. As a more specific example, in accordance with some implementations, the inlet has a circular cross-section, and the cross-sectional dimension of the inlet corresponds to a diameter (called "d1" in FIG. 12).

As depicted in FIG. 12, the ICD also has a longitudinal, or axial, length (called "L" in FIG. 12) between the ICD the inlet(s) and the outlet of the ICD. The L length corresponds to a length along with the ICD's chamber narrows. In this manner, along the L length, the chamber of the ICD narrows, or reduces in its cross-sectional area. It is noted the L length is a narrowing length of the chamber and may or may not correspond to the length of the chamber of the ICD, depending on the particular implementation. In general, the L length of the ICD is sufficient to establish simultaneous flow rotation and translation from the inlet(s) to the outlet of the ICD for purposes of establishing the selective pressure losses and flow regimes, as disclosed herein.

In accordance with example implementations, the L length is at least fifty percent greater than the cross-sectional dimension of the inlet. For example implementations in which the cross-sectional dimension of the inlet is the d inlet diameter, L may be greater than 1.5 d. In accordance with example implementations, the L length may be in a range of two to five times the d inlet diameter. In accordance with further example implementations, the L length may be greater than five times the d inlet diameter. Thus, many variations are contemplated, which are within the scope of the appended claims.

The ICD, in accordance with example implementations, has a monotonically decreasing cross section along the L length. In this manner, in accordance with example implementations, the chamber has a cross-section that monotonically decreases from a region near the end of the chamber associated with the inlet(s) to a region near the end of the chamber associated with the outlet. As depicted in FIG. 12, in accordance with example implementations, a diameter (called "D" in FIG. 12) of the transverse base wall forms the maximum cross-sectional diameter of the chamber, and the diameter of the chamber monotonically decreases with distance along the axis 428 from the base wall, i.e., D>D1>D2>D3> . . . >D(x), where "D1," "D2" and "D3" are depicted in FIG. 12, and "D(x)" represents a diameter of the chamber at an arbitrary axial position ("x") between the axial position corresponding to the D3 diameter and the outlet 424.

Figure 13A:
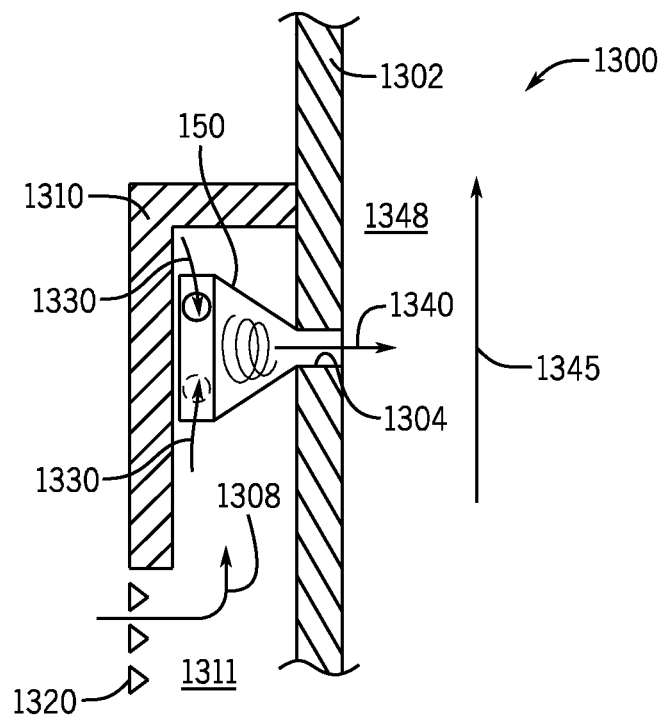
FIGS. 13A, 13B and 13C are schematic views of screen assemblies illustrating inflow control device orientations according to example implementations.

Although FIG. 2 depicts the ICD 150 as being disposed in a wall of the base pipe, in accordance with further example implementations, the ICD 150 (or another ICD, as disclosed herein) may be part of a screen assembly 1300 (FIG. 13A) in which the ICD 150 is disposed in a fluid receiving region 1311 between a screen 1320 and a base pipe 1302. Referring to FIG. 13A, the screen assembly 1300 may include a housing 1310 that is schematically shown in FIG. 13A as attaching the screen 1320 to the base pipe 1302. The fluid receiving region 1311 receives a flow 1308 through the screen 1320, and the ICD 150 controls fluid communication between the fluid receiving region 1311 and the interior of the base pipe 1302. As an example, the ICD 150 may be part of a ring (not shown) that is installed on the base pipe 1302. The ICD 150 for the example implementation of FIG. 13A is oriented so that its longitudinal axis produces a flow 1340 that is generally orthogonal to a direction 1345 of the production fluid flow inside the base pipe 1302. The outlet of the ICD 150 may be disposed in a corresponding radial port 1304 of the base pipe 1302. As shown in FIG. 13A, the inlet(s) of the ICD 150 may be in direct communication with the fluid receiving region 1311 such that an incoming flow 1330 into the ICD 150 is generally equally divided among the inlet(s).

Figure 13B:
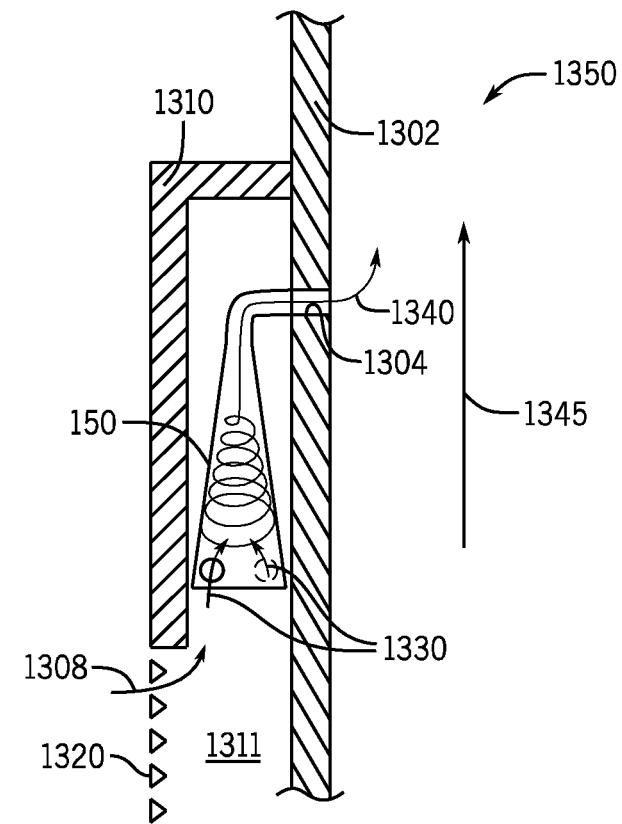

Referring to FIG. 13B, in accordance with further example implementations, the ICD 150 (or another ICD, as disclosed herein) may be part of a screen assembly 1350. The screen assembly 1350 shares similar features with the screen assembly 1300 of FIG. 13A, with these similar features being denoted by the same reference numerals. Unlike the screen assembly 1300, the ICD 150 is oriented such that the longitudinal axis of the ICD 150 generally extends along the longitudinal axis of the base pipe 1302.

Figure 13C:
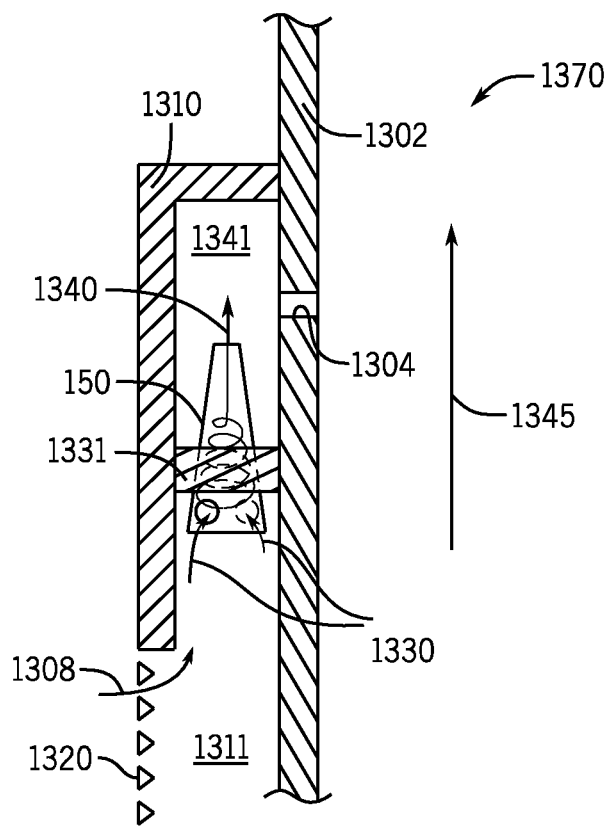

FIG. 13C depicts a screen assembly 1370 according to a further example implementation. The screen assembly 1370 has similar features to the screen assembly 1350 of FIG. 13B, with similar reference numerals denoting the similar features. Unlike the screen assembly 1350, the ICD 150 of the screen assembly 1370 is disposed in an annular barrier, or ring 1331, that radially extends between the base pipe 1302 and the housing 1310. In accordance with further example implementations, the ring 1331 may extend radially between the housing 1310, with the housing 1310 being separated into annular extending sections, on either side of the ring 1331. As an example, the base pipe 1302 may be part of a base pipe assembly that is formed in part by the ring 1331. As also depicted in FIG. 13C, in accordance with example implementations, the outlet of the ICD 150 directs the flow into a fluid receiving region 1341 formed between the ring 1331 and the housing 310 so that the flow enters the region 1341 first before being communicated through the port 1304 (instead of being piped directly to the port 1304).

Figure 14:
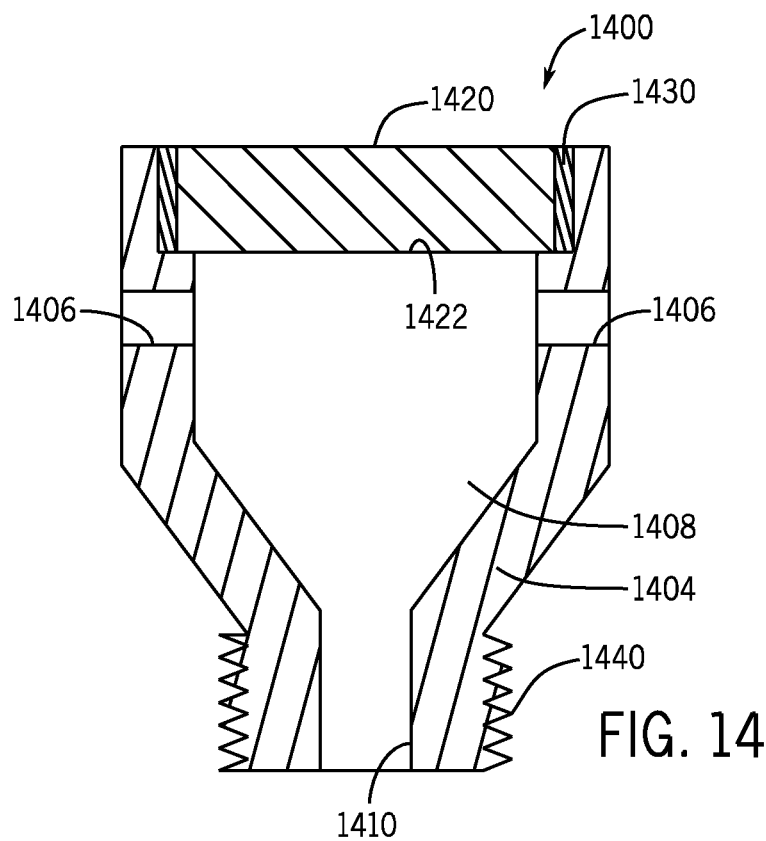
FIGS. 14 and 15 are cross-sectional views of inflow control devices according to example implementations.

Referring to FIG. 14, in accordance with example implementations, an ICD 1400 may have a two piece construction in that the device 1400 may include a body 1404 and a cap 1420. In accordance with example implementations, the body 1404, and the cap 1420 may both be formed from a material that exhibits relatively strong structural integrity for the downhole environment, such as steel or tungsten carbide. The body 1404 contains inlets 1406, an outlet 1410 and a chamber 1408 for the ICD 1400, and these features may be formed by machining, injection molding, casting and so forth, depending on the particular implementation.

The cap 1420, for this example implementation, closes off the chamber 1408 by forming the transverse base wall for the chamber 1408. In this manner, as depicted in FIG. 14, the body 1404 has an opening 1422 at the inlet end of the chamber 1408 for purposes of receiving the cap 1420. Moreover, as depicted in FIG. 14, the opening 1422 may be sized to correspond to an outer dimension of the cap 1420. In accordance with some implementations, the cap 1420 may be disc-shaped, and the opening 1422 may be a circular cylindrically-shaped recess to receive the disc-shaped cap 1420.

For example implementations in which the body 1404 and the cap 1420 are formed from weldable materials, such as steel, the body 1404 and the cap 1420 may welded together, as illustrated by the weld 1420 at reference numeral 1430. In further example implementations in which the body 1404 and the cap 1402 are formed from non-weldable materials, such as tungsten carbide, the body 1404 and the cap 1420 may be secured together using another type of bond, such as a braze bond, for example.

The cap 1420 and the body 1404 may be secured/sealed together in other ways, other than by way of welding or brazing, in accordance with further example implementations. For example, in accordance with further example implementations, the cap 1420 may be press fit into the opening 1422; cap 1420 and body 1404 may have mating conical surfaces and may be pressed together; the cap 1420 and body 1404 may be threadably secured via corresponding threads between the cap 1420 and the body 1404; and so forth. Thus, many implementations are contemplated, which are within the scope of the appended claims.

Among its other features, in accordance with example implementations, the body 1404 may have external threads 1440 that surround the outlet 1410, for purposes of threadably securing the inflow control device 1400 to the screen assembly. As another variation, the inflow control device 1400 may be secured to the screen assembly using a press fit mechanism, matching conical surfaces, and so forth, depending on the particular implementation.

Figure 15:
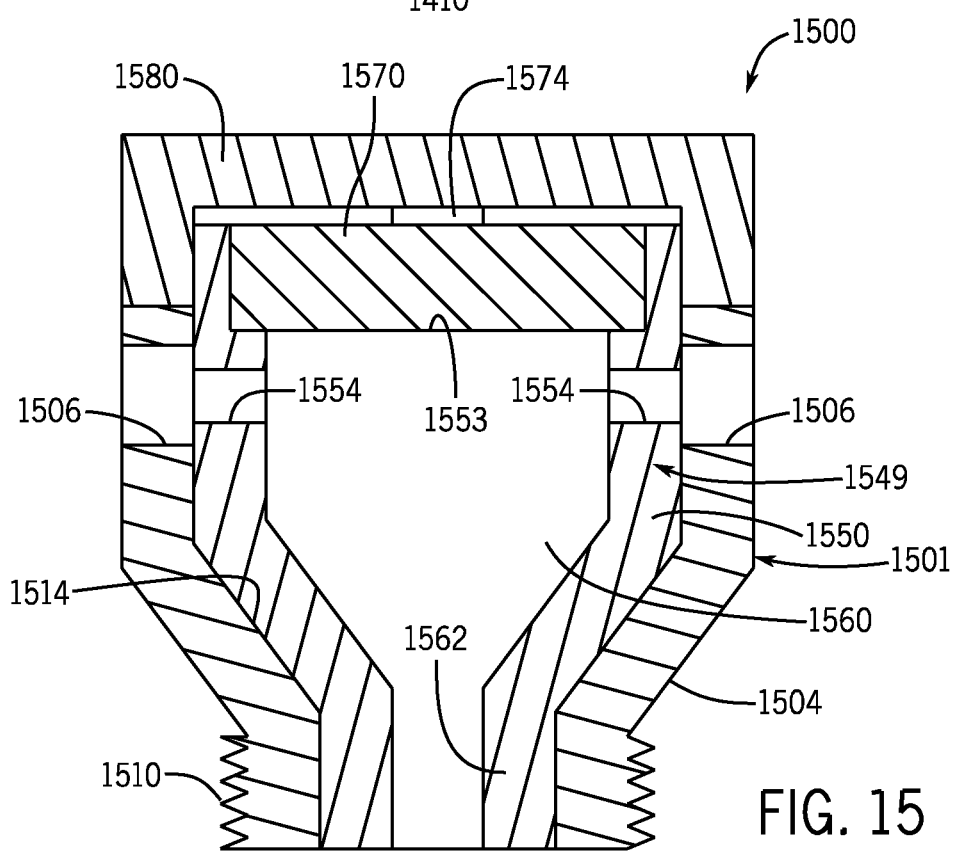

As yet another example implementation, an ICD 1500 that is depicted in FIG. 15 may be constructed using different materials: a material that has a relatively higher structural integrity for the downhole environment, such as steel or tungsten carbide; and a material that has a relatively high resistance to erosion, such as a ceramic material. More specifically, referring to FIG. 15, in accordance with example implementations, the ICD 1500 has an outer assembly 1501 (an assembly made from steel or tungsten carbide, for example) and an inner assembly 1549 (an assembly made from a ceramic material, for example) that forms an insert, which is physically separate from the outer assembly 1501 and is received inside a receptacle of the outer assembly 1549.

In accordance with example implementations, the inner assembly 1549 includes a construction that is similar (although different materials) to the ICD 1400 of FIG. 14: the assembly 1549 includes a ceramic body 1550 that forms a chamber 1560, inlets 1554 and outlet 1562 for the ICD 1500; and the traverse base wall of the chamber 1560 is formed from a ceramic cap 1570 that is received in an opening 1553 of the body 1550. For purposes of structurally supporting the inner assembly 1549, the outer assembly 1501 has a body 1504 (a steel or tungsten carbide body, for example) that has an interior profile that generally corresponds to the outer profile of the inner assembly 1549 so that the inner assembly 1549 is closely received into the body 1504.

As depicted in FIG. 15, the metal body 1504 has inlets 1506 that correspond to the inlets 1554 of the inner assembly 1549, an outlet that corresponds to outlet 1562 and has an opening at the inlet 1506 end of the chamber 1560 to receive a cap 1580 (a steel or tungsten carbide cap, as examples). As examples, the cap 1580 may be welded or brazed to the metal body 1504 (depending on the materials that are used); or may be secured in other ways to the metal body 1504, as discussed above for the ICD 1400. As depicted in FIG. 15, in accordance with example implementations, a spacer 1574 may be disposed between the caps 1580 and 1570 for purpose of ensuring that the inner assembly 1549 is relatively tightly secured inside the outer assembly 1501. As examples, the spacer 1574 may be a ceramic material, may be steel, may be another material or may be a mechanical device (a spring, for example).

As also depicted in FIG. 15, in accordance with example implementations, outer threads 1510 may be formed on the body 1504 of the outer assembly 1501 for purposes of threadably securing the inflow control device 1500 to the screen assembly, although other fasteners/techniques may be used to secure the ICD 1500 to the screen assembly, as discussed above for the ICD 1400.

In accordance with some example implementations, the ICD 1500 may include at least one alignment feature for purposes of aligning the inner 1549 and outer 1501 assemblies. For example, in accordance with some implementations, a land and groove arrangement (a raised land on the exterior of the body 1550 and a corresponding groove formed on the inside of the body 1504, for example) may be used for purposes of properly aligning, or registering, the assemblies 1549 and 1501 so that the inlets 1506 and 1554 as well as possibly one or more additional features of the assemblies 1549 and 1501 properly align with each other.

Figure 16:
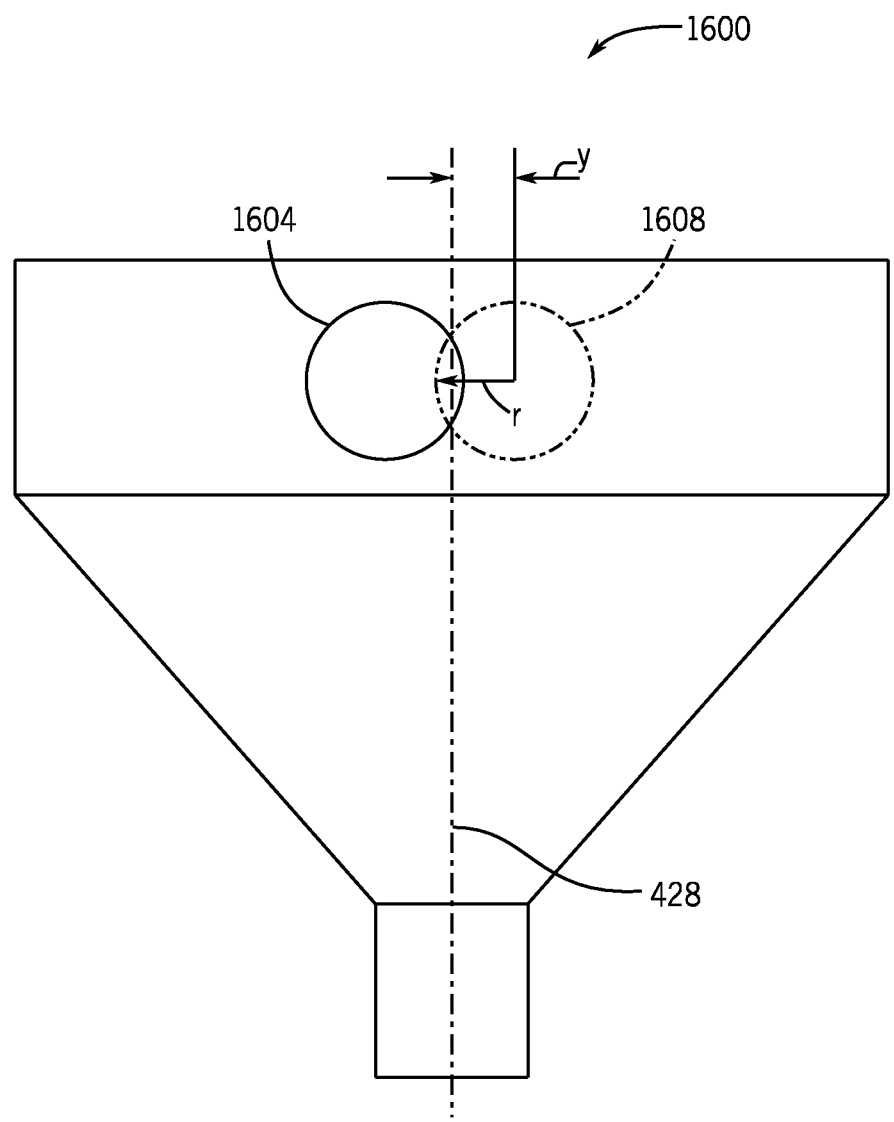
FIG. 16 is a side view of an inflow control device according to a further example implementation.

Depending on the particular implementation, an ICD may have opposing inlets that inject flows into the ICD, which completely or partially oppose each other with some degree of overlap. In this manner, referring to FIG. 16, for an ICD 1600, the extent or degree to which the inlets (and corresponding injected tangential flows) overlap each other may be represented by an overlap ratio. In this manner, FIG. 16 depicts generally opposing inlets 1604 and 1608, which for this example, have identical geometries and are circular. The inlets may have different geometries; and one or both inlets may be non-circular, in accordance with further example implementations. The amount of overlap may be represented by y/r, where "y" represents the distance between the center of the inlet 1608 and the midpoint of overlap between the inlets 1604 and 1608; and "r" represents the inlet radius.

The degree of overlap may be selected based on the wanted and unwanted fluids. In this manner, in accordance with some implementations, the overlap ratio may be close to 1.0 (i.e., the inlets 1604 and 1608 may directly or near directly oppose each other) when the ICD 1600 is being used to separate a relatively light oil (an oil have a viscosity less than 10 centipoise, for example) from gas; and the overlap ratio may be zero or near zero when the ICD 1600 is being used to separate a relatively heavier oil from gas.

Other implementations are contemplated, which are within the scope of the appended claims. For example, in accordance with further example implementations, the inflow control device may have a metal housing having a chamber, inlets and an outlet as described herein; and the interior surface of the chamber may be lined with an erosion prevention coating, such as a ceramic coating. In contrast to the ICD 1400, the ceramic of the ICD in this further example embodiment is bonded or otherwise affixed to the inner surface of the metal housing.

As another example, in accordance with example implementations, the ICD may be used for purposes of injection. For example, in accordance with some implementations, the direction of flow through the ICD may be reversed, so that fluid is received at the outlet, and fluid is discharged at the inlet of the ICD. As more specific example, in accordance with example implementations, a screen assembly may be installed in a well and contain ICDs for the purpose of controlling production from the well, as described herein. However, at some point (prior to the beginning of production or at some point thereafter), a flow (a chemical treatment flow, for example), may be pumped downhole and routed, via the ICDs, into the surrounding wellbore/formation.

In another example implementation, a technique includes, downhole in a well, communicating first and second fluids from a first region surrounding a first part of a screen assembly into a first inflow control device. The screen assembly includes at least one screen. The technique further includes, downhole in the well, communicating the first and second fluids from a second region surrounding the screen assembly into a second inflow control device, where a combined flow rate of the first and second fluids in the first region is different from a combined flow rate of the first and second fluids in the second region. Simultaneously generated flow rotation and translation inside the first inflow control device are used to establish first flow resistance ratio for the first and second fluids for the first region; and simultaneously generated flow rotation and translation inside the second inflow control device are used to establish a second flow resistance ratio for the first and second fluids for the second region. The second flow resistance ratio is different than the first flow resistance ratio.

In yet another example implementation, a system includes a screen assembly; a first inflow control device and a second inflow control device. The screen assembly extends into first and second regions of a well, and the screen assembly includes at least one screen. The first inflow control device is disposed in the screen assembly to receive the first and second fluids from the first region; and the second inflow control device is disposed in the screen assembly to receive the first and second fluids from the second region. The combined flow rates of the first and second fluids in the first region is different from the combined flow rates of the first and second fluids in the second region. The first inflow control device is adapted to generate simultaneous flow rotation and translation inside a narrowing chamber of the first inflow control device to provide a first flow resistance ratio for the first and second fluids for the first region; and the second inflow control device is adapted to generate simultaneous flow rotation and translation inside a narrowing chamber of the second inflow control device to provide a second flow resistance ratio for the first and second fluids for the second region. The second flow resistance ratio is different than the first flow resistance ratio.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. An apparatus comprising:
an inflow control device to be disposed in a well and being adapted to receive a flow, the inflow control device comprising:
a chamber having a first end, a second end and a length along which a cross-section of the chamber decreases;
an outlet disposed at the second end of the chamber; and
a first inlet and a second inlet, each inlet having a cross-sectional dimension and extending through a transverse base wall of the chamber,
wherein the transverse base wall of the chamber forms a maximum cross-sectional diameter of the chamber, and the diameter of the chamber decreases with distance along a longitudinal axis of the inflow control device from the transverse base wall to a discharge at the outlet, which is coaxial with the longitudinal axis,
wherein the inflow control device and the chamber are asymmetric about the longitudinal axis, wherein the chamber does not have a frustoconical section of the inflow control device,
wherein an inlet to outlet ratio of the inflow control device through the transverse base wall of the chamber to the discharge is 2:1,
wherein, in response to the received flow, the first inlet injects a first jet into the chamber near the first end of the chamber, and the second inlet injects a second jet into the chamber near the first end of the chamber, wherein the first jet and the second jet interact to produce a fluid flow inside the chamber that rotates and translates in a direction along the length of the chamber toward the outlet, and
wherein the first jet and the second jet are generally tangential with a perimeter of the base wall.

2. The apparatus of claim 1, wherein the length is at least fifty percent greater than the cross-sectional dimension of the first and second inlets.

3. The apparatus of claim 1, wherein the chamber has a cross-sectional area that monotonically decreases along the length.

4. The apparatus of claim 1, wherein the first and second inlets and the chamber are adapted to form a vortex inducer selective to at least one fluid property of the flow such that the vortex inducer regulates a flow regime of the flow at the outlet based on the at least one fluid property.

5. The apparatus of claim 4, wherein the at least one fluid property comprises a property selected from the set consisting essentially of a viscosity, a fluid density and a flow rate.

6. The apparatus of claim 1, wherein the first and second inlets and the chamber are adapted to form a resistance for the flow through the inflow control device based at least in part on at least one fluid property of the flow.

7. The apparatus of claim 1, wherein the chamber comprises an interior wall having dimples or a spirally-extending groove configured to increase a pressure loss of the fluid flow.

8. A system usable with a well, comprising:
a base pipe;
at least one screen assembly to communicate a fluid flow between a region outside of the screen assembly and an interior space of the base pipe; and
at least one inflow control device comprising:
a chamber having a first end, a second end and a length along which a cross-section of the chamber decreases;
an outlet disposed at the second end of the chamber; and
a first inlet and a second inlet, each inlet having a cross-sectional dimension and extending through a transverse base wall of the chamber,
wherein the transverse base wall of the chamber forms a maximum cross-sectional diameter of the chamber, and the diameter of the chamber decreases with distance along a longitudinal axis of the at least one inflow control device from the transverse base wall to a discharge at the outlet, which is coaxial with the longitudinal axis, wherein the inflow control device and the chamber are asymmetric about the longitudinal axis, wherein the chamber does not have a frustoconical section of the inflow control device, wherein an inlet to outlet ratio of the at least one inflow control device through the transverse base wall of the chamber to the discharge is 2:1, wherein, in response to the received flow, the first inlet injects a first jet into the chamber, and the second inlet injects a second jet into the chamber, to regulate a flow regime of a flow at the outlet based at least in part on a fluid property of the flow, and wherein the first jet and the second jet are generally tangential with a perimeter of the base wall, and wherein the first jet and the second jet interact to produce a combined flow that rotates and translates in a direction along the length of the chamber toward the outlet.

9. The system of claim 8, wherein the chamber has a cross-sectional area that monotonically decreases along the length.

10. The system of claim 8, wherein the screen assembly comprises a screen and a fluid receiving region to receive fluid through the screen; and wherein the inflow control device is disposed to regulate fluid communication between the region outside of the screen assembly and an interior of the base pipe.

11. The system of claim 10, wherein the base pipe comprises a longitudinal axis and the length of the chamber extends in a direction orthogonal to the longitudinal axis of the base pipe.

12. The system of claim 8, wherein the chamber comprises an interior wall having dimples or a spirally-extending groove configured to increase a pressure loss of the combined flow.

13. A method comprising:

downhole in a well, communicating fluid from a first region surrounding a screen assembly through a screen and into a chamber of an inflow control device via a first inlet and a second inlet of the inflow control device, wherein the first inlet and the second inlet of the inflow control device extend through a transverse base wall of the chamber, wherein the transverse base wall of the chamber forms a maximum cross-section diameter of the chamber, and the diameter of the chamber decreases with distance along a longitudinal axis of the inflow control device from the transverse base wall to a discharge at an outlet of the chamber, which is coaxial with the longitudinal axis, wherein the inflow control device and the chamber are asymmetric about the longitudinal axis, wherein the chamber does not have a frustoconical section of the inflow control device, wherein an inlet to outlet ratio of the inflow control device through the transverse base wall of the chamber to the discharge is 2:1, and producing first and second jets that are generally tangential with a perimeter of the base wall, wherein the first and second jets interact to produce a combined flow that rotates and translates in a direction along the length of the chamber toward the outlet; and using the inflow control device to regulate communication of the fluid into a base pipe of the screen assembly, wherein using the inflow control device comprises regulating a flow regime at the outlet of the chamber of the inflow control device based on at least one fluid property of the fluid.

14. The method of claim 13, wherein regulating the flow regime comprises injecting the fluid through the first and second inlets and into the chamber of the inflow control device to produce a rotating flow that translates along a length of the chamber to the outlet of the inflow control device, wherein the chamber decreases in cross-section along the length and the length is greater than a cross-sectional diameter of the first and second inlets.

15. The method of claim 13, wherein regulating the flow regime comprises communicating through the chamber, which comprises a monotonically decreasing cross-section between the first and second inlets of the chamber and the outlet.

16. The method of claim 13, wherein regulating the flow regime comprises regulating a resistance to the fluid flowing through the inflow control device based on at least one fluid property of the fluid.

17. The method of claim 13, further comprising:

communicating a fluid flow from an interior of the base pipe, through the inflow control device, and into the first region.

18. The method of claim 13, wherein using the inflow control device to regulate communication of the fluid comprises:

using the first inlet of the inflow control device to receive part of the fluid flow;

using the second inlet of the inflow control device to receive another part of the fluid flow, wherein the first and second inlets are oriented to inject the first and second jets into the chamber of the inflow control device, wherein the first and second jets are opposed and partially overlapping flows relative to each other; and using the partially overlapping flows to regulate the flow regime.

19. The method of claim 13, comprising using dimples or a spirally-extending groove of an interior wall of the chamber to increase a pressure loss of the combined flow.

* * * * *